J. A. MAYERS.
INSTANTANEOUS WATER HEATER.
APPLICATION FILED JUNE 5, 1915. RENEWED JUNE 3, 1920.

1,353,174.

Patented Sept. 21, 1920.
3 SHEETS—SHEET 1.

J. A. MAYERS.
INSTANTANEOUS WATER HEATER.
APPLICATION FILED JUNE 5, 1915. RENEWED JUNE 3, 1920.

1,353,174.

Patented Sept. 21, 1920.

3 SHEETS—SHEET 2.

WITNESSES:

INVENTOR

ATTORNEY

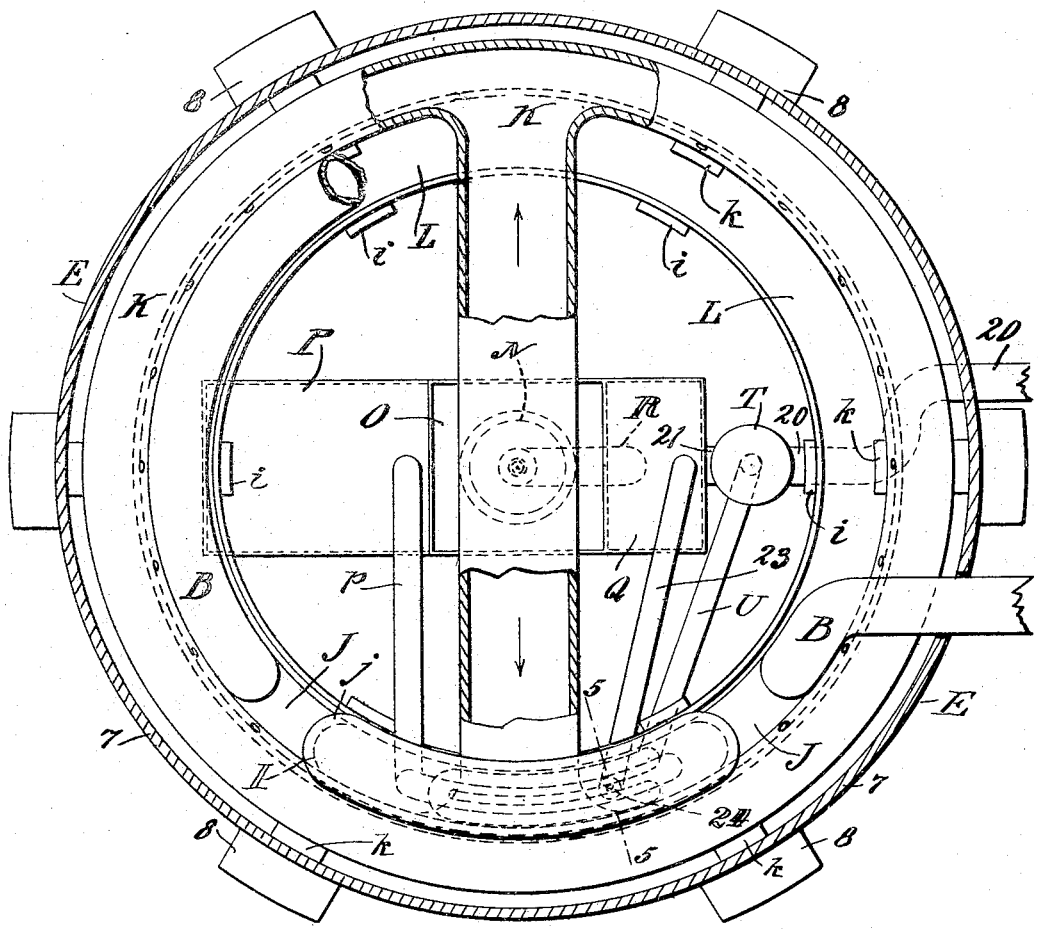

UNITED STATES PATENT OFFICE.

JOSEPH ALEXANDER MAYERS, OF NEW YORK, N. Y.

INSTANTANEOUS WATER-HEATER.

1,353,174.   Specification of Letters Patent.   Patented Sept. 21, 1920.

Application filed June 5, 1915, Serial No. 32,270. Renewed June 3, 1920. Serial No. 386,326.

*To all whom it may concern:*

Be it known that I, JOSEPH ALEXANDER MAYERS, a citizen of the United States, and resident of Brooklyn, county of Kings, and State of New York, have invented certain new and useful Improvements in Instantaneous Water-Heaters, of which the following is a specification.

This invention relates to instantaneous water heaters of the character employing either gaseous or liquid fuel, and especially adapted for automatic operation by thermostatic means. The invention has for its objects to provide an effective thermostatic valve mechanism for starting and stopping the operation of the main burner as water is passed through or ceases to pass through the heater, without requiring the water flow actuated fuel valve heretofore employed in this type of heater and to provide a durable, inexpensive structure which embodies few and simple parts assembled in compact arrangement.

In the apparatus shown for carrying out my invention I employ an inner casing and an outer casing, a coil having a trapped section, a closed thermostatic chamber under the influence of said trapped section, a pilot-burner adjacent thereto; a heat-supplying burner, automatic thermostatic fuel and air-controlling devices, a dome for said casings and means supporting them, and a drip-trough for catching and carrying off particles of condensation, all as will be hereinafter fully described and specifically set forth in the annexed claims.

Figure 1:
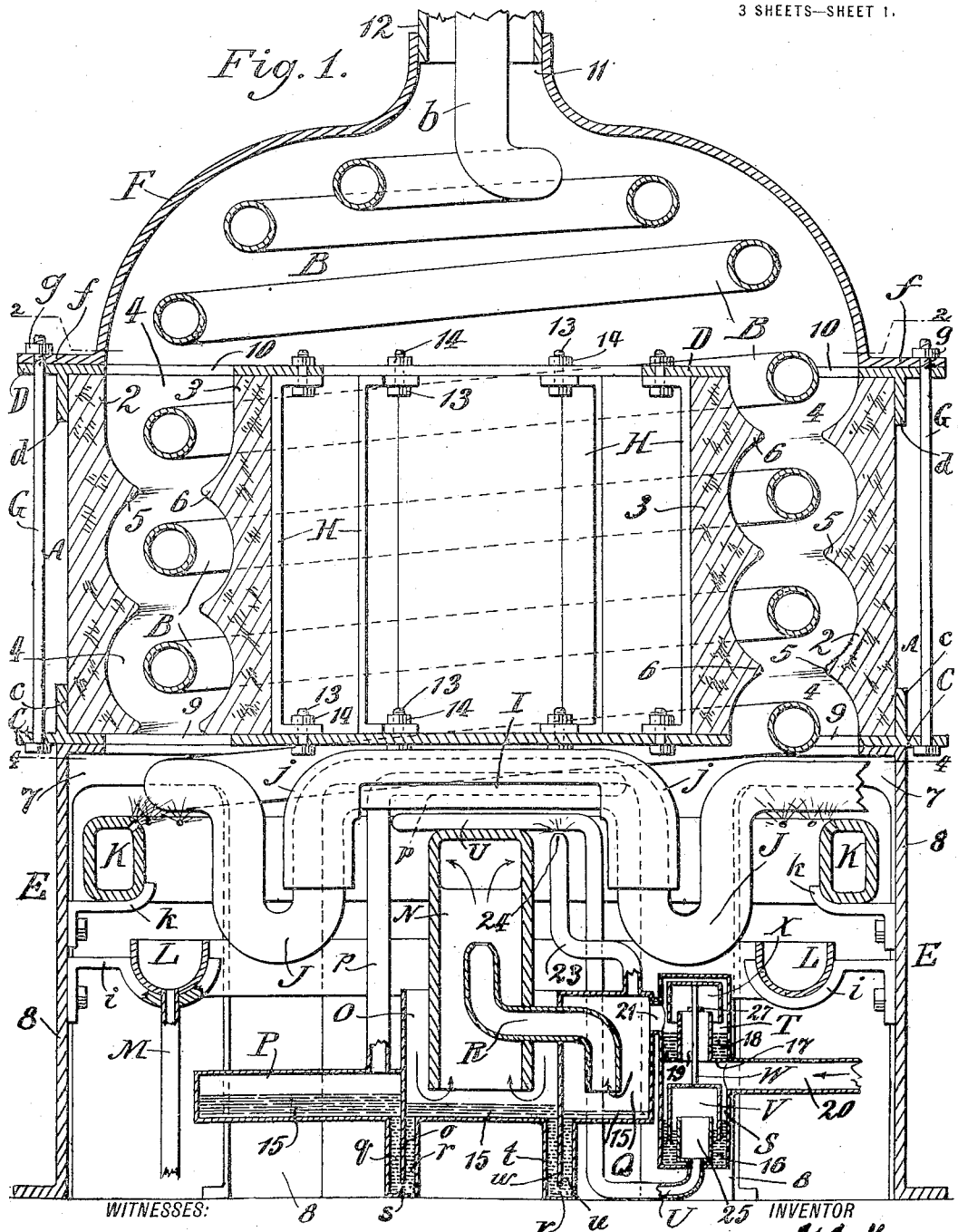
Figure 2:
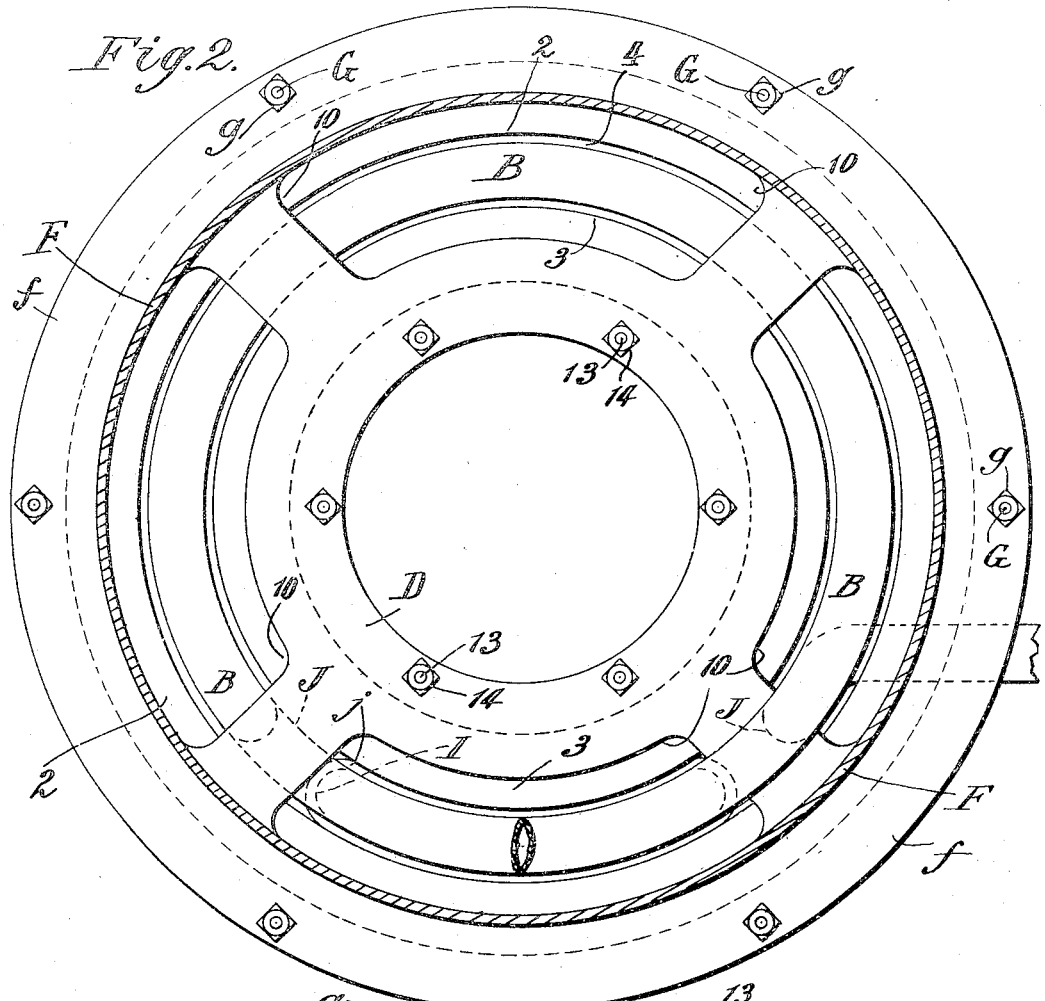
Figure 3:
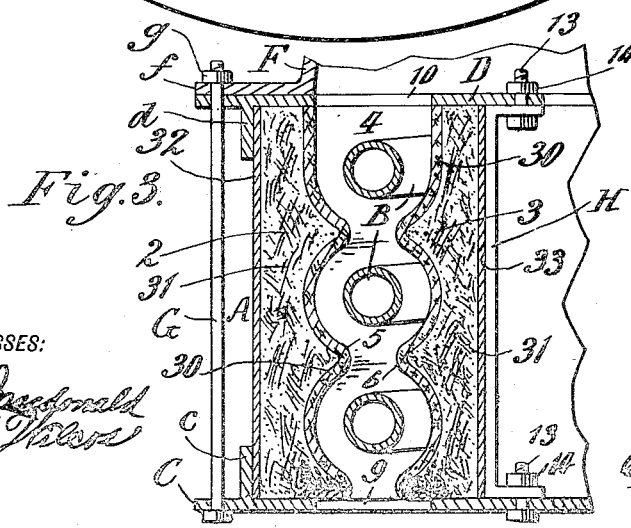

In the accompanying drawings forming part of this specification Figure 1 is a vertical sectional elevation of my improved heater; Fig. 2 a sectional plan view taken on the line 2—2 of Fig. 1; Fig. 3 a vertical sectional view of a part of the device showing a modification; Fig. 4 a sectional plan view taken on the line 4—4 of Fig. 1; Fig. 5 a detail cross sectional view taken on the line 5—5 of Fig. 4; and Figs. 6, 7 and 8 are similar views showing slight modifications.

In the example of my invention illustrated by the accompanying drawings, A indicates a cylindrical casing embodying the outer part 2 and the inner part 3, said parts being separated by a spiral space 4, comprising a passage-way for the coiled tube B, for containing the element to be heated. The casing A is composed of asbestos or analogous non-heat radiating material and its spiral passage-way embodies corrugations 5 and 6 which partly surround the coils to retain heat therearound and reflect and deflect heat thereon.

The casing A is held between circular heads or plates C and D, having the annular flanges $c$ and $d$; and said casing is mounted on a base E, which comprises the cylindrical part 7 and the legs 8.

The plates C and D, are respectively provided with segmental openings 9 and 10, through which particles of combustion may ascend, and the device is provided with a dome or cap F, having a flange $f$, which peripherally engages the plate D, and is secured thereto by means of the elongated bolts G, and nuts $g$, which hold the plates C, D and the sections of the cylinder A together. Posts H are also connected between the plates C and D, by means of the bolts and nuts 13 and 14, to provide a strong structure.

The turns of the coil B are contracted at its upper parts and its inlet or upper terminal part $b$, leads through the chimney 12 and from any source of water-supply. The lower terminal of the coil B is provided with a trapped part I, located between two downwardly directed traps J, and said trapped part is provided with a covering $j$, composed of asbestos or analogous material to prevent radiation of heat therefrom.

As a means for heating the coil I employ a ring burner K, which is mounted on brackets $k$, of the base E. An annular trough L, is also connected to said base, by means of brackets $i$, for catching particles of condensation which may drop from the coil. This trough communicates with a drain or other receptacle for waste water by means of a tube M. The burner K is provided with an inlet or mixing tube N, which leads into an air-supply chamber O which is open to the atmosphere and arranged adjacent to a closed thermostatic chamber P, having an extension $p$, which has its free end part closed and extended into the trapped part I of the coil B, or said free end part may be extended around and closely adjacent to said trapped part as shown by Fig. 6, of the drawings. The chambers O and P are connected by means of contracted passage-ways $q$ and $r$, which are separated from each other throughout their major parts by means of a partition $o$, but connected at their bottom parts by an opening $s$. The chamber O communicates with a fuel-admission and supply chamber Q, which is closed to the atmosphere, communication between said chambers being maintained by means of the contracted passage-ways $t$ and $u$, and an opening $v$, through the partition $w$, between said chambers O and Q. Said chambers O, P and Q are respectively supplied with mercury 15, embodying valve-means for control. A fuel-supply pipe R leads from the chamber Q to the mixing tube N, for supplying gas thereto. S is an inclosed chamber of cylindrical or other adaptable contour and containing a body of mercury 16; T is an extension of said chamber having a horizontal partition 17, making a bottom for said extension and containing a body of mercury 18, said extension embodies the fuel-admission and supply chamber and is tightly sealed to the atmosphere. The bottom 17 has a tubular extension 19, with its upper end or outlet above the surface of the mercury 18. A pipe 20 communicates with the chamber S, for admission of fuel, said pipe leads from any source of fuel-supply. Leading outwardly from the extension T, and communicating with the chamber Q, is a pipe 21, for supplying gas to the feed-pipe R, which leads from said chamber Q, into the mixing tube N. A small tube 23 also leads from the chamber Q, and is supplied at its free end with a pilot-burner 24, which is arranged closely adjacent to the burner K.

A sealed thermostatic chamber U communicates with the chamber S, and has an enlarged outlet part 25 over the surface of the mercury 16, its closed outer or free end being over the pilot-burner whereby the heat from the light of said burner may have a direct influence thereon to heat and expand the thermostatic medium in said thermostatic chamber.

Permanently seated in the mercury 16, is an inverted cup V, which operates in a downward direction by gravity and in an upward direction by expansion of the medium in the thermostatic member U. A rod W extends upwardly from said cup V, through a suitable bearing 27, located across the extension 19, and is connected to an inverted cup-valve X, adapted to be seated in the mercury 18, to cut off the gas supply to the burners.

In the operation of the invention flames and hot gases from the ring burner K, shoot upward with a tendency to a vertical rise, and as they pass upward these hot gases and flames sweep along the under surface of the coil from turn to turn until they pass through the chimney, but in every upward motion some of the heat not absorbed by the coils will be absorbed by the corrugated casing sections 2 and 3, which casings, as they partly surround the cross sections of the coil turns, will reflect this heat back to the coil and in this manner add to the efficiency of the device by retarding the ascent of the heat to the chimney and deflecting heat on the coils.

The control of gas is obtained by the thermostatic mercury seal valve device shown in Fig. 1, which controls both gas and air in proper proportion, and which is operated by the medium in thermostatic chamber P, which communicates with the trapped section I of the coil by means of its extension $p$. By the placing of the thermostatic member $p$ in the trapped section I of the coil, which incloses a small portion of the water in the total coil, said section is kept heated by the pilot light, and to a sufficiently high degree, that when water is not being drawn through the coil, it keeps the mercury valve 15, closed so that gas can not pass through it and to the burner K. The small pilot light 24, is only enabled to keep the trapped section of the coil at a sufficiently high temperature to shut off the gas, due to the fact that the water in said section of the coil is practically separated from the water in the rest of the coil as it, when heated, rises to the top of said trapped portion of the coil containing the thermostatic member $p$, and the water in said section of the coil has to be heated before it will pass through the traps J, so that when the heater is not in operation this water does not circulate through the coil at either side of the trapped section. The major part of the coil may be cold while the short trapped section only is maintained hot by the pilot light, and if this section of the coil was not trapped as shown, the small amount of heat given by the pilot light 24, would not raise the temperature in the entire coil to a sufficient number of degrees to keep the gas which is controlled by the mercury valve cut off. When water is drawn through the coil the thermostatic medium in chamber P is chilled, pulling the mercury in said chamber P up and the mercury in chambers O and Q downward, thus permitting gas from chamber Q and air from chamber O to enter the mixer N, and pass to the burner K. I have shown the air chamber O, between the thermostatic chamber P and the gas chamber Q, and also the safety valve device in line with each other, and the plane forming the cross section passing through their centers, for the purpose of simplifying the illustration and description of my invention herein set forth, but I do not confine myself to this specific arrangement and correlation of said parts.

Should the pilot light, for any cause, go out the thermostatic chamber U will cool down and the medium in same will contract and cause the cup-valve X to descend into the mercury in chamber T, thus shutting off gas both from the pilot light and from the main burner until the pilot light or other parts are repaired and the chamber U again heated and the pilot-burner lighted, as clearly set forth in my co-pending application Serial No. 24,661.

By my construction it will be especially noted that there is no necessity of doors and springs such as are found in the ordinary type of instantaneous heater, and also owing to the corrugated sections of the asbestos casing and the inclosed coil only a minimum of heat is allowed to escape through the chimney.

By reason of the open bottom construction of this heater, should there be any explosions therein, they would take place downward through this open construction instead of being inclosed as in the ordinary cast iron casing or bodies, and therefore less liable to destroy the heater.

A further important feature in this invention is the upward trapping of a section of the coil and covering the upper and major portion of the under surface of same with a nonconducting material so that the pilot light can keep this section hot and localize the hot water therein by the downwardly depending traps at the ends thereof; the pilot light having three separate and distinct functions:—(1) to light the burner, (2) to keep a thermostatic medium hot and thus keep gas admitted to the burner whenever in use and when out to shut off the gas entirely, (3) to keep the water in the localized section of the coil hot at all times when water is not being drawn through the coil, and therefore preventing admission of gas to the burner.

I have shown in this example of the application of my invention, a specific proportional gas control valve but I might insert the valve shown in my Letters Patent No. 1,202,869, dated October 31, 1916, which turns gas on or off at predetermined temperatures, or I might use this valve to admit or cut off the full volume of gas followed by the proportional valve shown in this particular application.

I have shown the thermostatic chamber inclosed within a section of the coil, but I might place this chamber without or adjoining and in contact with this section of the coil, as shown in Fig. 6, of the drawings.

Further, though I have shown and described the thermostatic means as an expanding gas or liquid, I may employ a solid thermostat in conjunction with the localized section of the coil. I therefore do not confine myself to any of these means with respect to the localized section of the coil, as it is clear that the principal feature of that part of my invention is the fact that I upwardly trap a section of the coil and separate a quantity of water in said section from the water in the major part of the coil, so that an undue amount of gas for the pilot light will not be required to keep the entire coil at a sufficiently high temperature to keep the gas shut off from the burner when the heater is not in use. It is further noteworthy that though the major part of the trapped section I is covered with a non-heat radiating material to maintain it in warm condition the part of said cover over the pilot-light is cut away to permit the pilot light to have direct heating influence on said trapped section. In the modifications shown by Figs. 7 and 8 of the drawings, the trapped section I, has a segmental cross sectional form instead of circular, the material being heavier than the major part of the coil, thus providing a large body retaining the heat. Other modifications of form might be employed.

In the modification of my invention shown by Fig. 3 of the drawings the sections 2 and 3, of the casing A each embody a shell of compressed non-heat radiating material 30, and a filling of loose non-heat radiating material 31, sheet metal cylinders 32 and 33 being employed to hold the loose material in place. Other variations of construction of the non-heat radiating casing may be employed, and the sections thereof may be composed of any adaptable material without departing from the spirit and scope of my invention.

Having thus described my invention what I claim as new, and desire to secure by Letters Patent, is:

1. A liquid heater comprising a single tubular coil having an upper inlet and a lower outlet, and an integrally formed upwardly extended arched part in its lower turn, and a downwardly extended trap at each end of said arched part, and a coating of non-heat radiating material partly covering said arched part; in combination with thermostatic means for gas and air control, and a pilot-burner, said burner adapted to heat said arched part, and said means for gas and air control arranged in the heated zone of said arched part.

2. A heating apparatus comprising a vertical tubular coil having an upper inlet and a lower outlet, and an upwardly extending arched part in its lower turn, said part communicating at each end with a depending trap, and a coating of non-heat radiating material partly covering said arched part, and means connecting said parts; and a pilot-burner for heating said arched part, and means for gas and air control arranged in the heated zone of said arched part and responsive to the temperature thereof.

3. A liquid heater comprising a vertical tubular coil having an upper inlet and a lower outlet, and an upwardly extended arched part in its lower turn, and a coating of non-heat radiating material partly covering said arched part, and depending trapped parts communicating with said upwardly extended arched part at each end thereof; in combination with a burner for heating said coil and thermostatic gas and air control for said burner and thermostatic gas means, located within the heated zone of said arched part to operate said gas and air control, and a pilot-burner for heating said arched part.

4. In an instantaneous water heater, the combination with the main burner and pilot burner, of a water container through which the water to be heated and used is passed, comprising a portion which is located above the immediately adjacent parts of the container through which water passes into and out of said portion, the latter being heated by the pilot burner and thereby raised to a temperature which is higher when no water is passing than when water is passing through the container, and a thermostatic valve mechanism controlling the operation of the main burner and responsive to the temperature of said portion and actuated by the changes in temperature of said portion to start and stop the operation of the main burner accordingly as water passes or ceases to pass through said container.

5. In an instantaneous water heater, the combination with the main burner and pilot burner, of a water container through which the water to be heated and used is passed, comprising a portion which is located above the immediately adjacent parts of the container through which water passes into and out of the said portion, the latter being heated by the pilot burner and thereby raised to a temperature which is higher when no water is passing than when water is passing through the container, a heat insulating covering for said portion, and a thermostatic valve mechanism controlling the operation of the main burner and responsive to the temperature of said portion and actuated by the changes in temperature of said portion to start and stop the operation of the main burner accordingly as water passes or ceases to pass through said container.

In testimony that I claim the foregoing as my invention, I have signed my name in presence of two witnesses, this 3rd day of June, 1915.

JOSEPH ALEXANDER MAYERS.

Witnesses:
    GENEVIEVE MACDONALD,
    CHARLES F. WILCOX.